(12) United States Patent
Xu et al.

(10) Patent No.: US 10,368,275 B2
(45) Date of Patent: *Jul. 30, 2019

(54) METHOD AND APPARATUS FOR UE MOBILITY IN A SMALL CELL SYSTEM

(71) Applicant: Samsung Electronics Co., Ltd., Suwon-si, Gyeonggi-do (KR)

(72) Inventors: Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,458

(22) Filed: Feb. 2, 2018

(65) Prior Publication Data

US 2018/0184343 A1    Jun. 28, 2018

Related U.S. Application Data

(63) Continuation of application No. 15/114,987, filed as application No. PCT/KR2015/000789 on Jan. 26, 2015, now Pat. No. 9,888,412.

(30) Foreign Application Priority Data

Jan. 28, 2014   (CN) .......................... 2014 1 0041300
Dec. 31, 2014   (CN) .......................... 2014 1 0851469

(51) Int. Cl.
*H04W 36/00*   (2009.01)
*H04W 72/04*   (2009.01)
(Continued)

(52) U.S. Cl.
CPC ... *H04W 36/0072* (2013.01); *H04W 36/0055* (2013.01); *H04W 36/0069* (2018.08);
(Continued)

(58) Field of Classification Search
CPC ..................................................... H04W 36/00
See application file for complete search history.

(56) References Cited

U.S. PATENT DOCUMENTS 9,338,711 B2 *   5/2016   Wu ................... H04W 36/0005
2011/0269465 A1   11/2011   Xu et al.
(Continued)

OTHER PUBLICATIONS

"Handover procedure in case of bearer only served by SeNB(1A)", XP050738361, MSN, Nokia Corporation, 3GPP TSG-RAN WG3 Meeting #82, R3-132101, San Francisco, USA, Nov. 11-15, 2013.
(Continued)

*Primary Examiner* — Michael T Vu
(74) *Attorney, Agent, or Firm* — Jefferson IP Law, LLP

(57) ABSTRACT

The present application discloses a method for a master eNB (MeNB) handover or a secondary eNB (SeNB) handover in a small cell system, comprising: sending by a source MeNB information of a source secondary cell (Scell) to a target MeNB; sending by the target MeNB a message to the source MeNB, the message notifying the source MeNB to suspend data transmission on a bearer of the SeNB. Until a message of data transmission resuming is received, the data transmission/reception is started to continue. The method for a MeNB handover or a SeNB handover provided in the present application may reduce the reconfiguration of the bearer for the UE, avoid releasing the bearer by error, and improve the system throughput and the data rate of transmission.

14 Claims, 7 Drawing Sheets

(51) Int. Cl.
*H04W 76/30* (2018.01)
*H04W 76/34* (2018.01)
*H04W 76/15* (2018.01)

(52) U.S. Cl.
CPC ....... *H04W 72/0406* (2013.01); *H04W 76/30* (2018.02); *H04W 76/15* (2018.02); *H04W 76/34* (2018.02)

(56) References Cited

U.S. PATENT DOCUMENTS

| | | | |
|---|---|---|---|
| 2011/0274087 A1 | 11/2011 | Liang et al. | |
| 2012/0207129 A1 | 8/2012 | Sun | |
| 2013/0258958 A1 | 10/2013 | Dinan | |
| 2015/0045052 A1 | 2/2015 | Pao et al. | |
| 2016/0249259 A1* | 8/2016 | Park | H04W 36/00 |

OTHER PUBLICATIONS

"Handover procedure in case of bearer served by MeNB and SeNB(3C)", XP 050738362, MSN, Nokia Corportaion, 3GPP TSG-RAN WG3 Meeting #82, R3-132102, San Francisco, USA, Nov. 11-15, 2013.

"HO signaling flow for small cell enhancement", XP050738271, CMCC, 3GPP TSG-RAN WG3 Meeting #82, R3-132227, San Francisco, USA, Nov. 11-15, 2013.

"Xn functions", XP 050738360, MSN, Nokia Corportaion, 3GPP TSG-RAN WG3 Meeting #82, R3-132100, San Francisco, USA, Nov. 11-15, 2013.

"Mobility signalling in Dual Connectivity",XP050755605, Samsung, 3GPP TSG-RAN WG3 Meeting #83, R3-140145, Prague, Czech Republic, Feb. 10-14, 2014.

* cited by examiner

METHOD AND APPARATUS FOR UE MOBILITY IN A SMALL CELL SYSTEM

PRIORITY

This application is a continuation application of prior application Ser. No. 15/114,987, filed on Jul. 28, 2016, which issued as U.S. Pat. No. 9,888,412 on Feb. 6, 2018, and was a National Phase Entry of PCT International Application No. PCT/KR2015/000789, which was filed on Jan. 26, 2015, and claims a priority to Chinese Patent Application No. 201410041300.4, which was filed on Jan. 28, 2014, and claims a priority to Chinese Patent Application No. 201410851469.6, which was filed on Dec. 31, 2014, the contents of each of which are incorporated herein by reference.

TECHNICAL FIELD

The present application relates to wireless communication technologies, and more particularly, to a method and an apparatus for a secondary eNB (SeNB) handover and/or a master eNB (MeNB) handover in a small cell system.

BACKGROUND ART

Current mobile communication is more and more tending to provide multimedia service with high rate transmission to users.

FIG. 1 shows a system architecture of System Architecture Evolution (SAE).

As shown in FIG. 1, a user equipment (UE) 101 is a terminal device for receiving data. Evolved Universal Terrestrial Radio Access Network (E-UTRAN) 102 is a wireless access network, comprising a macro base station (eNodeB/NodeB) which may provide the UE an interface for accessing the wireless network. A mobility management entity (MME) 103 is responsible for managing mobility context, session context and security information of the UE. A serving gateway (SGW) 104 mainly provides the user-plane functions. The MME 103 and the SGW 104 may be located in the same physical entity. A packet data network gateway (PGW) 105 is responsible for functions, such as charging, monitoring, and may also be located in the same physical entity with the SGW 104. A policy and charging rules function entity (PCRF) 106 provides policy and charging rules of quality of service (QoS). A serving General Packet Radio Service (GPRS) support node (SGSN) 108 is a network node device providing routing for data transmission in Universal Mobile Telecommunications System (UNITS). A home subscriber server (HSS) 109 is a home subsystem of the UE, responsible for protecting information of the UE, including current location of the UE, an address of a serving node, security information of the UE, packet data context of the UE, etc.

The 3rd Generation Partnership Project (3GPP) has proposed requirements of small cell enhancement in release 12 (Rel-12). Target scenarios of the small cell enhancement include scenarios with macro cell coverage and without macro cell coverage, indoor and outdoor, ideal and non-ideal backhaul enhancement, as shown in FIG. 2.

In the case with macro cell coverage, it has been proposed to apply a technique of carrier aggregation at different base stations. A macro cell and a small cell may work in different bands. There are two kinds of architectures that apply the technique of carrier aggregation at different base stations, i.e., one based on Radio Access Network (RAN) split, and the other based on Core Network (CN) split, for the user-plane data. The architecture based on CN split means that for a bearer established on a pico cell, the user-plane data is directly sent by the CN SGW to the pico cell, but not forwarded by the macro cell.

In the architectures of small cells, the UE may simultaneously transmit and receive data to and from two base stations, named as dual-connectivity, in which only one base station is responsible for sending a Radio Resource Control (RRC) message to the UE, and interconnect with the CN control-plane entity MME, such base station named as MeNB, and the other named as SeNB. One cell in the MeNB for the UE is a primary cell (Pcell) of the UE, through which a RRC message is sent to the UE, and other cells are secondary cells (Scells). One cell among the Scells of the SeNB is a primary Scell of the SeNB (pScell), providing functions of the pScell. There is a physical uplink control channel in the pScell, but none in other Scells. A cell group of the MeNB is named as MCG, and a cell group of the SeNB is named as SCG. Configurations of SCG at the UE side are performed by the SeNB, which is sent from the MeNB to the UE via a RRC container. The MeNB does not parse the RRC container, or parse but not modify the configurations in the RRC container.

When a UE moves, or the channel quality changes, the MeNB can determine to handover the Scell to a new base station, which becomes the new SeNB, called as a SeNB handover, or the MeNB can determine to handover the Pcell to a new base station, which becomes the target MeNB, called as a MeNB handover. During the MeNB handover process, an existing method is to switch all the bearers to the target MeNB, of which the disadvantages are frequent reconfiguration of the bearers, and lack of efficient utilization of the dual connectivity to improve the system throughput and transmission rate of the UE. During the SeNB handover process, according to an existing method, the secondary bearers are established at a new SeNB, and the new SeNB configures the bearer at the UE side. After the bearer establishment is successful, the MeNB sends the bearer release to the source SeNB. It is possible for the source SeNB to configure the bearers at the UE side according to existing methods, so it may occur that the newly established bearers at the UE side would be released. Therefore, the present application relates to the method for the MeNB handover, in which the target MeNB selects the source SeNB as the target SeNB, and further relates to the method for the SeNB handover, in which the MeNB handovers a SeNB to another base station.

In accordance with another aspect of the present disclosure, an apparatus for supporting a user equipment (UE) mobility in a small cell system is provided. The apparatus is configured to perform the method of one of claims 1 to 14.

Therefore, a need exists for a method and an apparatus for UE mobility in a small cell system.

The above information is presented as background information only to assist with an understanding of the present disclosure. No determination has been made, and no assertion is made, as to whether any of the above might be applicable as prior art with regard to the present disclosure.

DISCLOSURE

Technical Problem

Aspects of the present disclosure are to address at least the above-mentioned problems and/or disadvantages and to provide at least the advantages described below. Accordingly, an aspect of the present disclosure is to provide a method and an apparatus for a MeNB handover and/or a SeNB handover, which may reduce the reconfiguration of the bearer for the UE.

Another aspect of the present disclosure is to provide a method and an apparatus for avoiding releasing the bearer by error, and improving the system throughput and the data rate of transmission.

Technical Solution

In accordance with an aspect of the present disclosure, a method for a SeNB handover in a small cell system is provided. The method comprises: sending, by a MeNB, a message to a target MeNB or a target SeNB, the message carrying information of a bearer to be established; sending, by the target MeNB or by the target SeNB, a response message to the MeNB; sending, by the MeNB, a bearer release request message to a source SeNB, the bearer release request message carrying an indication information to indicate whether the source SeNB needs to release a bearer or a Scell at a UE side; and sending, by the source SeNB, a bearer release response message to the MeNB.

After the message is received by the source SeNB, when the message does not carry indication information, or indication information is carried to indicate the bearer at the UE side needs to be configured, the source SeNB releases the configurations related to the secondary bearer or the Scell at this eNB, and releases the secondary bearer or the Scell at the UE side, for example, by configuring a release bearer list, which at least includes an identifier of the Scell or the secondary bearer. Such configuration is included in a RRC container to send from the source SeNB to the MeNB and to the UE. When an indication information is carried, and the indication information indicates the bearer at the UE side doesn't need to be configured, the source SeNB releases the configurations related to the secondary bearer or the Scell at this eNB, but does not need to release the secondary bearer or the S cell at the UE side, and not need to send the RRC container to the MeNB.

The indication information may also be an indication of SeNB handover, an indication of release locally, or an indication of releasing all resources.

The bearer release response message sent by the source SeNB to the MeNB is optional.

Preferably, it also comprises that the MeNB sends a RRC reconfiguration request message to the UE. A list of the Scells or the secondary bearers to be released within in the said RRC reconfiguration request message is configured by the MeNB.

In accordance with another aspect of the present disclosure, a method for a MeNB handover and/or a SeNB handover in a small cell system is provided. the method comprises: sending, by a source MeNB, information of a source SeNB to a target MeNB, the information of the source SeNB including an identifier of a bearer, a base station identifier of a source Scell or a cell identifier of the source Scell; sending, by the target MeNB, a message to the source MeNB.

The target MeNB determines whether a certain bearer may be established at the source SeNB, according to the information of the source SeNB sent from the source MeNB, QoS information of the bearer and measurement report of a UE.

When the target SeNB and the source SeNB are the same, the message sent from the target MeNB to the source MeNB carries an identifier of a bearer and an identifier of the target SeNB or Scell, or the message carries an indicator of source bearer suspending.

Preferably, it also comprises that the source MeNB sends a bearer release request message to the source SeNB, the message including the bearer information for the bearer release, e.g., an identifier of the bearer or the Scell, and/or the information for the bearer unrelease (i.e., bearer suspending), e.g., an identifier of the bearer or the Scell, an indicator of the bearer suspending. Alternatively, the source MeNB sends a bearer suspending message to the source SeNB, the message carrying an identifier of the S cell or the secondary bearer.

According to the received information of the bearer suspending, the source SeNB is aware that a certain bearer is still being established at this SeNB, and pauses the data transmission/reception at this bearer, waiting for receiving a message of data transmission resuming sent by the target MeNB. When received, the SeNB starts continuing the data transmission/reception.

Preferably, it also comprises that the target MeNB sends a bearer resuming message to the source SeNB. After the target MeNB receives a path switch response, the target MeNB notifies the source SeNB to start continuing the data transmission/reception.

In accordance with another aspect of the present disclosure, a method for a user equipment (UE) handover in a small cell system is provided. The method comprises: sending, by a source master eNB (MeNB), a handover request message to a target MeNB, the handover request message carrying information of a source secondary eNB (SeNB); sending, by the target MeNB, a SeNB addition request message to a target SeNB, to establish a data bearer in the target SeNB; sending, by the target SeNB, a SeNB addition response message to the target MeNB; sending, by the target MeNB, a handover response message to the source MeNB; and sending, by the source MeNB, a SeNB release request message to the source SeNB.

It can be seen from the above technical scheme that the method for a MeNB handover and/or a SeNB handover provided in the present application may reduce the reconfiguration of the bearer for the UE, avoid releasing the bearer by error, and improve the system throughput and the data rate of transmission.

Other aspects, advantages, and salient features of the disclosure will become apparent to those skilled in the art from the following detailed description, which, taken in conjunction with the annexed drawings, discloses various embodiments of the present disclosure

DESCRIPTION OF DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present application is further described in detail hereinafter with reference to the accompanying drawings to make the objective, technical solution and merits thereof more apparent.

Figure 1:
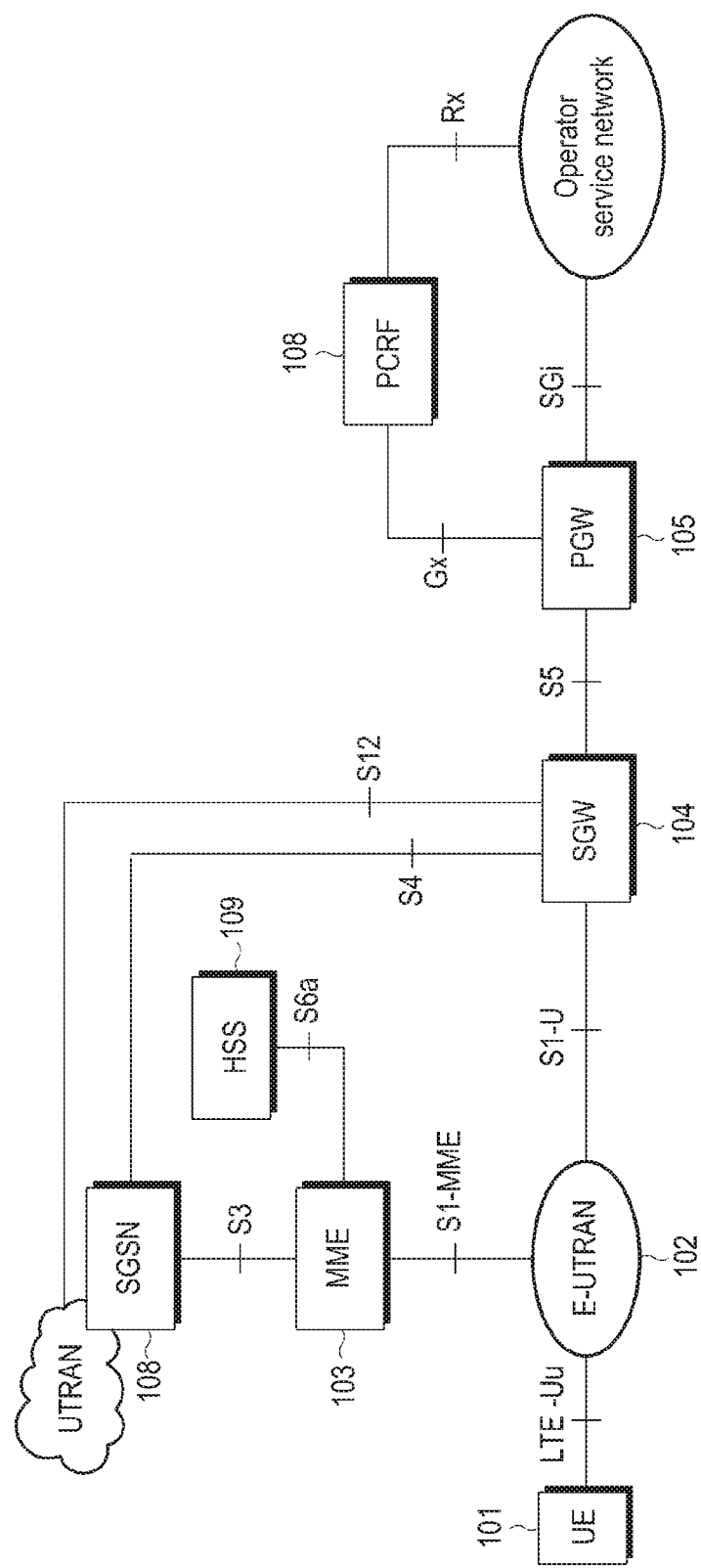
FIG. 1 is a schematic diagram illustrating an existing SAE system architecture.
Figure 2:
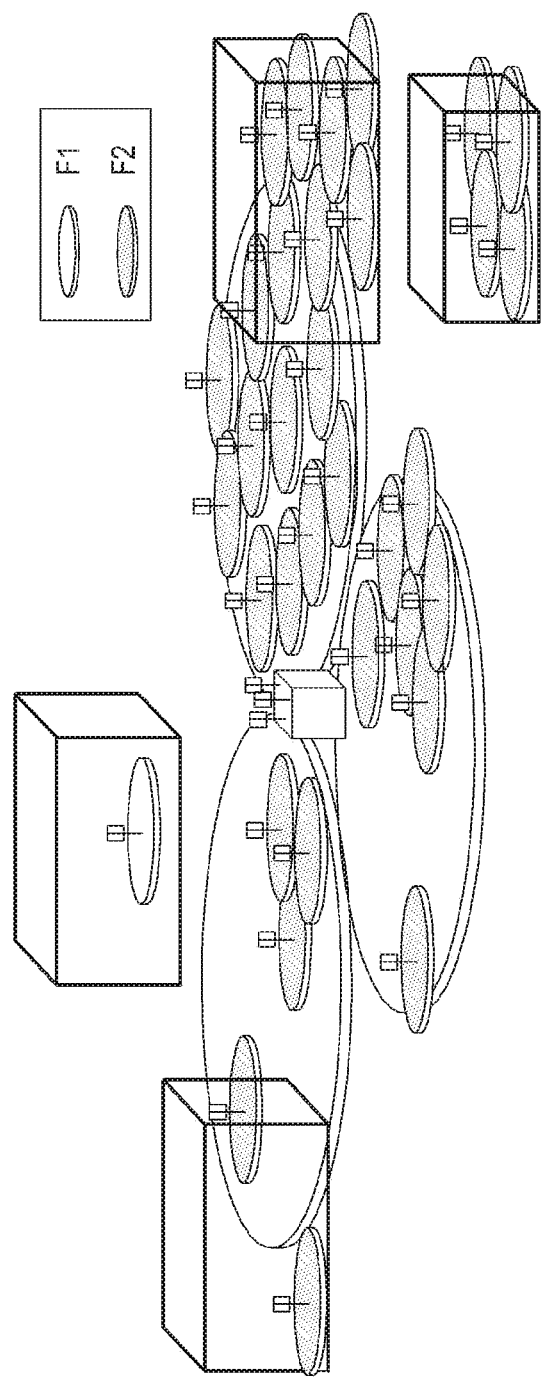
FIG. 2 is a schematic diagram illustrating deployment scenarios of small cell enhancement.
Figure 3:
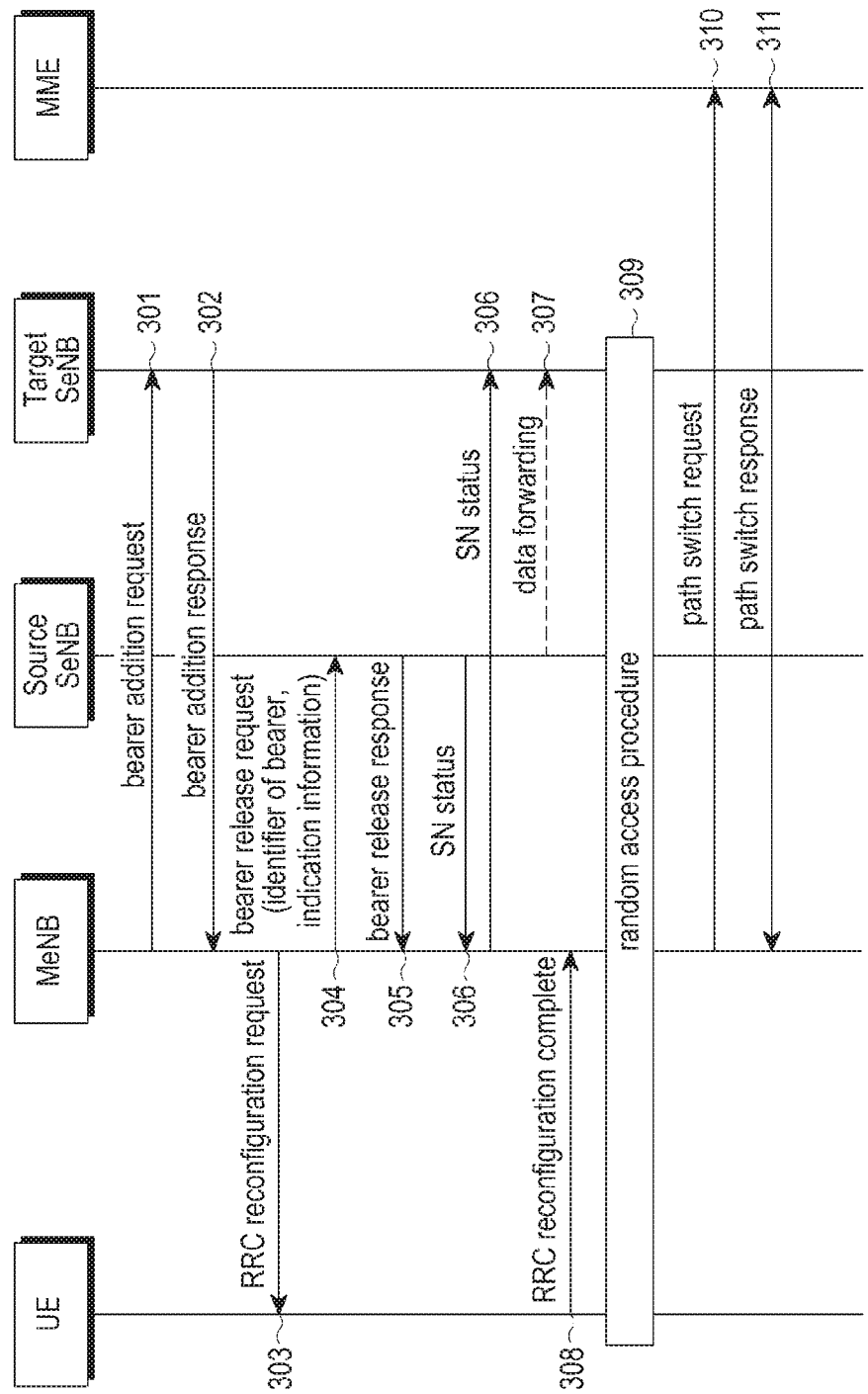
FIG. 3 is a schematic diagram illustrating a method according to a first embodiment of the present application.

FIG. 3 is a schematic diagram illustrating a method for a SeNB handover in a small cell system according to an embodiment of the present application, in which a MeNB determines to handover one SeNB to another without any change of the MeNB. It includes the following blocks.

In block 301, the MeNB sends a bearer addition request message to a target SeNB.

The MeNB determines to establish a bearer at a new SeNB. The bearer may be established previously at the source SeNB or at the MeNB, or may be a new bearer configured by the MME. The bearer addition request message may include an identifier of the bearer, QoS information of the bearer, UE capability information, etc.

The target SeNB determines the configuration information of the bearer for the UE according to the QoS information of the bearer and UE capability. The configuration information of the secondary bearer or the Scell for the UE is included in the RRC container by the target SeNB, and then the RRC container is sent to the UE via the MeNB. Thus, UE may configure its protocol stacks according to the configuration, e.g., Radio Link Control (RLC), Media Access Control (MAC).

In block 302, the target SeNB sends a bearer addition response message to the MeNB, the message carrying configuration information of the secondary bearer or the Scell for the UE.

As described above, the configuration information of the secondary bearer or the Scell for the UE, which is configured by the target SeNB, is included in the RRC container and then the RRC container is sent to the MeNB.

The MeNB may not parse the RRC container, and forward it to the UE. Alternatively, the MeNB may parse the RRC container to determine whether the configuration by the target SeNB can satisfy the requirements of UE capability. If not, the MeNB may reject the configurations from the target SeNB.

In block 303, the MeNB sends a RRC reconfiguration request message to the UE.

In block 304, the MeNB sends a bearer release request message to the source SeNB.

There are two cases in this regard. A first case is that the bearer previously established at the SeNB is established at a new SeNB in block 301. For this case, the bearer of the source SeNB is re-established at the target SeNB, which means that this bearer still belongs to the SCG, and the identifier of the secondary bearer or Scell is not changed. The corresponding new configuration information has been already configured by the target SeNB in the above steps, and sent to the UE by the MeNB. Hence, the source SeNB doesn't need to reconfigure the secondary bearer or the Scell where the bearer is established for the UE, and not need to generate a RRC container. However, if it is unknown for the source SeNB, it might still configure the secondary bearer or the Scell for the UE. When the secondary bearer or Scell release message is received by the source SeNB in block 304, the source SeNB will configure a secondary bearer or Scell release list, which includes the identifier of the Scell or the secondary bearer. Then the SeNB sends the list included in the RRC container to the UE via the MeNB. After the new configuration information is received, the UE could release the secondary bearer or Scell, which is newly established in block 303, therefore, an error occurs.

A second case is that the bearer established at the target SeNB in block 301 is different from the bearer previously established at the source SeNB. The bearer previously established at the source SeNB may be currently established at the MeNB as a Pcell or primary bearer, or it may still belong to the SCG but the identifier of the bearer or the Scell has been changed. For this case, the source SeNB needs to re-configure the Scell where the bearer is established for the UE and to generate a RRC container, which is then included in the bearer release response.

To identify those two cases, the MeNB includes indication information in the bearer release request message sent to the SeNB, to indicate whether the SeNB needs to configure the secondary bearer or Scell for the UE, needs to generate a RRC container and further sends it to the MeNB. According to the indication, there are two kinds of operations at the SeNB. For example, one operation is according to the indication of "NO configuration". When such indication is included in the bearer release request message, the SeNB is aware that it doesn't need to re-configure the secondary bearer or the Scell for the UE (i.e., not produce a release list for the UE), and not need to generate a RRC container to further send to the MeNB, but just needs to release the information of bearers stored on the SeNB. In addition, when it is the last bearer, it also needs to release the information of the UE, and send a release acknowledgement message to the MeNB. When such indication is not included in the bearer release request message, the SeNB needs to re-configure the secondary bearer or the Scell for the UE, with the new configuration information included in a RRC container, for example, the identifier of the S cell or the secondary bearer to be released is included in a release list, and the release list is included in the RRC container to further send to the MeNB. If no such indication information is included, the source SeNB needs to configure the bearer or Scell for the UE, generate new configuration in the RRC container, e.g. including the released Scell or bearer identifier into the release list, and including the released list into the RRC container and send it to the MeNB. Another operation is according to an indication of "Configuration". If so, the SeNB needs to re-configure bearers at the UE; if not, not re-configure the bearers at the UE. In a word, the indication information is able to indicate two different operations for the SeNB, so that according to the indication, it is optional for the SeNB to perform one of the above two operations.

In another embodiment, about the Scell release, the Scell release list for the UE is configured by the MeNB. The MeNB sends the RRC reconfiguration request message to the UE, in which the information about Scell release is configured by the MeNB. In specific, there are a Scell adding list, a reconfiguration list and a Scell release list in the RRC reconfiguration request message. In the Scell release list, there is the identifier of bearer or Scell to be released, which is set by the MeNB. In the Scell adding list or the reconfiguration list, the configuration of the Scell or the secondary bearer is set by the SeNB.

There are also an Internet Protocol (IP) address and a tunnel endpoint identifier (TEID) for data forwarding included in the bearer release request message.

In block 305, the source SeNB sends a bearer release response message to the MeNB.

In block 306, the source SeNB sends a sequence numbering (SN) status message to the MeNB, the message carrying the Packet Data Convergence Protocol (PDCP) SN of the secondary bearer. When the bearer is established at the new SeNB, the message may be sent from the MeNB to the new SeNB.

In block 307, according to the information for the data forwarding in block 304, the SeNB forwards the data based on the corresponding IP address and TEID. When the bearer is established at the new SeNB, the data may be sent from the source SeNB to the new SeNB.

In block 308, the UE sends a RRC reconfiguration complete message to the MeNB.

In block 309, UE starts the random access procedure to synchronize with the new SeNB. After the random access procedure is completed, the new SeNB may notify the MeNB the information of random access success if needed.

In block 310, the MeNB sends a path switch request message to the MME, the message including the bearer and the corresponding IP address and TEID for downlink reception. Then the message is sent from the MME to the SGW, which is omitted herein.

In block 311, the MME sends a path switch response message to the MeNB, the message including the uplink IP address and TEID allocated by the SGW.

Using the method as described in FIG. 3, it enables the source SeNB not to generate the unnecessary configuration information for the UE, and to avoid the source SeNB releasing the secondary bearer which is newly established.

Figure 4:
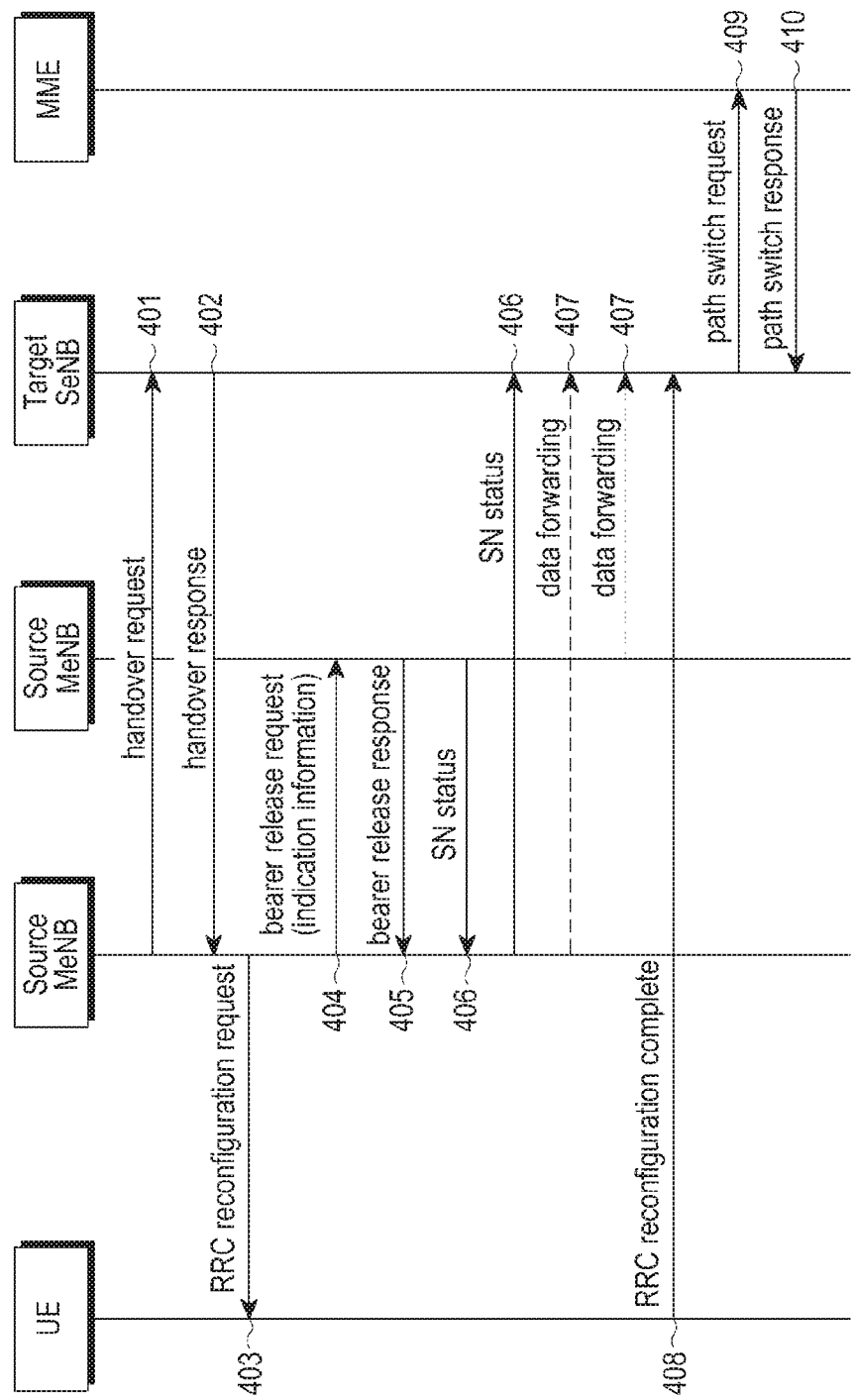
FIG. 4 is a schematic diagram illustrating a method according to a second embodiment of the present application.

FIG. 4 is a schematic diagram illustrating a method for a MeNB handover in a small cell system according to an embodiment of the present application, in which a MeNB determines to handover the MeNB to another eNB and all the bearers at the SeNB are switched to a target MeNB. It includes the following blocks.

In block 401, a source MeNB sends a handover request message to a target MeNB.

The MeNB determines to establish a bearer at the target MeNB. The bearer may be established previously at the source SeNB or at the source MeNB. The handover request message may include an identifier of the bearer, QoS information of the bearer, UE capability information, etc.

In block 402, the target MeNB sends a handover response message to the source MeNB, the message carrying configuration information of the bearer for the UE, which is configured by the target MeNB. The message is carried via a RRC container. In addition, the message includes the identifier of the bearer that is established successfully.

The MeNB may not parse the RRC container, and forward it to the UE.

In block 403, the MeNB sends a RRC reconfiguration request message to the UE.

In block 404, the MeNB sends a bearer release request message to the source SeNB.

The SeNB is not aware whether the MeNB is changed. For the case of non-MeNB handover, the SeNB shall configure the Scell or the secondary bearer for the UE, and this configuration is included within a RRC container to send to the UE via the MeNB. For the case of MeNB handover, all of the bearers are established at the target MeNB, which may send the configuration of the bearers to the UE through a RRC container. It is not necessary for the source SeNB to configure the S cell or the secondary bearer for the UE; otherwise, it is possible to release the bearer newly established by the target MeNB by error. Hence, there is indication information included in the bearer release message sent from the MeNB to the SeNB, e.g., a handover indicator is included to indicate whether the SeNB shall configure the secondary bearer or the Scell for the UE, and generate a RRC container to send to the MeNB. When such indication is included, the SeNB is known that it doesn't need to reconfigure the secondary bearer or the S cell for the UE, and not need to include a RRC container, but simply to release the information of the bearer stored at the eNB. When it is the last bearer, it also needs to release the information of the UE, and send a release acknowledgement message to the MeNB. When such indication is not included, the SeNB needs to re-configure the secondary bearer or the Scell for the UE, with the new configuration information included in a RRC container, for example, the identifier of the S cell or the secondary bearer to be released is included in a release list, and the release list is included in the RRC container to further send to the MeNB. Similar to the first embodiment, there are also some other ways with respect to the indication information. In a word, the indication is able to indicate two different operations for the SeNB, so that according to the indication, it is optional for the SeNB to perform one of the above two operations.

In another embodiment, about the bearer release, the bearer release list for the UE is configured by the MeNB. The MeNB sends the RRC reconfiguration request message to the UE, in which the information about bearer release is configured by the MeNB. In specific, there are a Scell adding list, a reconfiguration list and a Scell release list in the RRC reconfiguration request message. In the Scell release list, there is the identifier of bearer or Scell to be released, which is set by the MeNB. In the Scell adding list or the reconfiguration list, the configuration of the Scell or the secondary bearer is set by the SeNB.

Using the above-described method, it enables the source SeNB not to generate the unnecessary configuration information for the UE, and to avoid the source SeNB releasing the secondary bearer which is newly established.

There are also the identifier of the secondary bearer or Sell, an Internet Protocol (IP) address and a tunnel endpoint identifier (TEID) for data forwarding included in the bearer release request message.

In block 405, the source SeNB sends a bearer release response message to the MeNB.

In block 406, the source SeNB sends a sequence numbering (SN) status message to the MeNB. The message may carry the PDCP SN of the secondary bearer, and may be sent from the MeNB to the target MeNB.

In block 407, the source MeNB and the source SeNB forward the data on the bearer based on the corresponding IP address and TEID.

In block 408, the UE sends a RRC reconfiguration complete message to the MeNB.

In block 409, the MeNB sends a path switch request message to the MME, the message including the bearer and the corresponding IP address and TEID for downlink reception. Then the message is sent from the MME to the SGW, which is omitted herein.

In block 410, the MME sends a path switch response message to the MeNB, the message including the uplink IP address and TEID allocated by the SGW.

Using the method as described in FIG. 4, it enables the source SeNB not to generate the unnecessary configuration information for the UE, and to avoid the source SeNB releasing the secondary bearer which is newly established.

Figure 5:
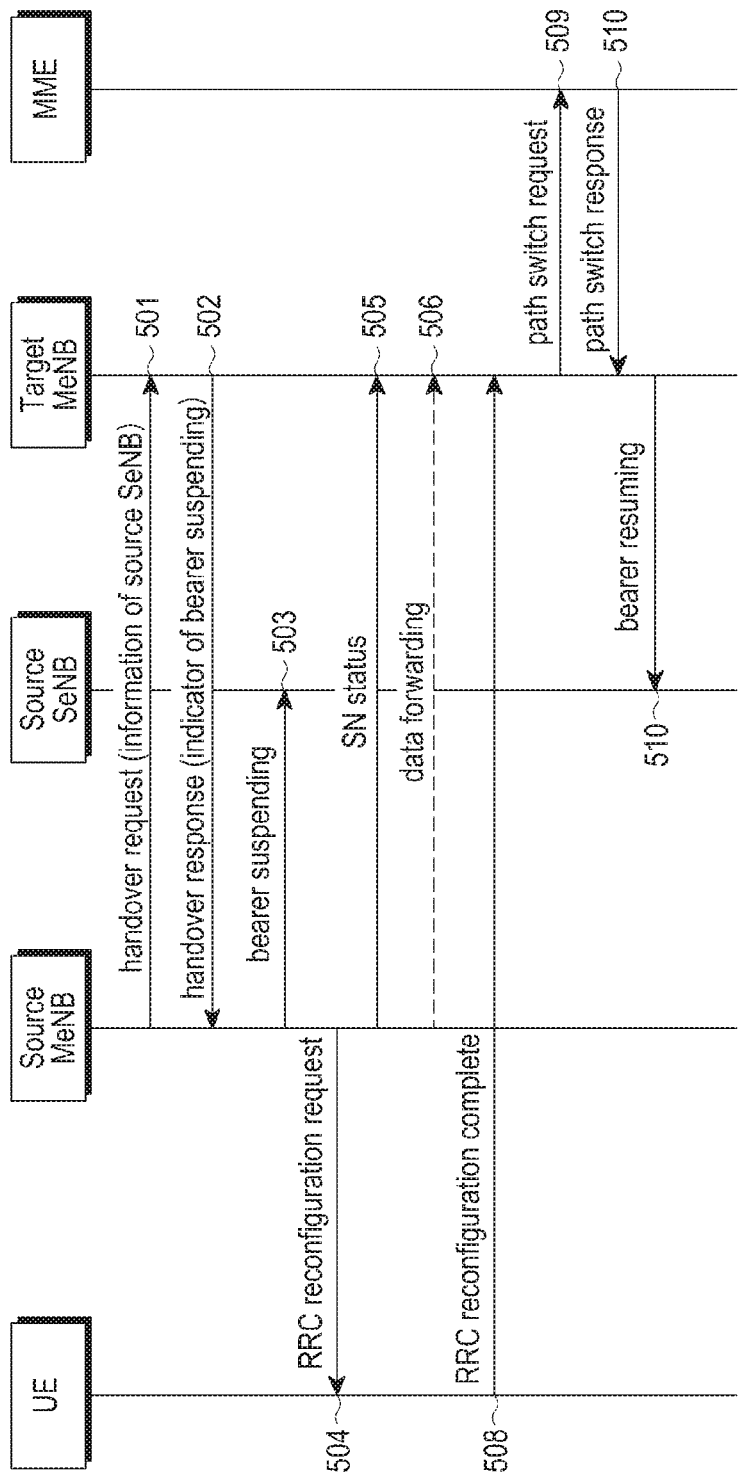
FIG. 5 is a schematic diagram illustrating a method according to a third embodiment of the present application.

FIG. 5 is a schematic diagram illustrating a method for a MeNB handover in a small cell system according to an embodiment of the present application, in which a MeNB determines to handover the MeNB to another and the target MeNB determines the bearer is maintained as being established at the source SeNB. It includes the following blocks.

In block 501, a source MeNB sends a handover request message to a target MeNB. The message carries the information of SeNB, which may include the eNB identifier or cell identifier of the Scell.

The handover request message also includes an identifier of the bearer, QoS information of the bearer, UE capability information, etc.

In block 502, the target MeNB sends a handover response message to the source MeNB, the message carrying configuration information of the bearer for the UE, which is configured by the target MeNB. The message is carried via a RRC container. In addition, the message includes the identifier of the bearer that is established successfully.

According to a measurement report and the information of the source SeNB, the target MeNB determines to continue using the source SeNB as the target SeNB. The secondary bearer originally established at the source SeNB is not switched to the target MeNB, i.e., still held at the source SeNB. Hence, it is unnecessary to perform the frequent process of bearer establishment and release. The handover response message in block 502 includes the identifier of the bearer that is established successfully, and the identifier of the target SeNB or Scell, or an indicator of the source bearer suspending.

In block 503, the source MeNB sends a bearer release request message to the source SeNB. The message includes the bearer information for the bearer release, e.g., an identifier of the bearer or Scell, and/or the information for the bearer unrelease (i.e., bearer suspending), e.g., a bearer identifier or a Scell identifier, an indication of the bearer suspending. Alternatively, the source MeNB sends a bearer suspending message to the source SeNB, the message carrying an identifier of the secondary bearer or the Scell.

In block 504, the MeNB sends a RRC reconfiguration request message to the UE.

According to the received message in block 502, when in the message, the target SeNB or the eNB where the target Scell is located is the same as the source SeNB, the source MeNB is able to determine that a certain bearer is still being established at the source SeNB. Alternatively when the message in block 502 indicates that a certain bearer will suspend, which is previously established at the source SeNB, the source MeNB sends a bearer suspending message to a source SeNB, the message may include the identifier of the bearer, the indicator of bearer suspending, or the message may also include the identifier of the bearer to be released, or may include an indicator in combination with the method in the first embodiment or the second embodiment. The same blocks as the first embodiment or the second embodiment and the corresponding description are omitted herein. After the bearer suspending message is received, the source SeNB is aware that a certain bearer is still being established at this SeNB, and suspends the data transmission/reception on this bearer, waiting for receiving a message of data transmission resuming sent by the target MeNB. When received, the SeNB resumes the data transmission/reception.

In block 505, the source SeNB sends a SN status message to the target MeNB. The message may carry the PDCP SN of the secondary bearer.

In block 506, the source MeNB forwards the data on the bearer based on the corresponding IP address and TEID.

In block 507, the UE sends a RRC reconfiguration complete message to the MeNB.

In block 508, the MeNB sends a path switch request message to the MME, the message including the bearer and the corresponding IP address and TEID for downlink reception. Then the message is sent from the MME to the SGW, which is omitted herein.

In block 509, the MME sends a path switch response message to the target MeNB, the message including the uplink IP address and TEID allocated by the SGW.

In block 510, the target MeNB sends a bearer resuming message to the SeNB. After the path switch response message is received, the target MeNB notifies the source SeNB to start continuing data transmission/reception.

Using the method as described in FIG. 5, it enables the source SeNB to continually work during the MeNB handover process, and to avoid the frequent bearer release and addition, reduce the data forwarding, and improve the system throughput and the data rate of transmission.

Figure 6:
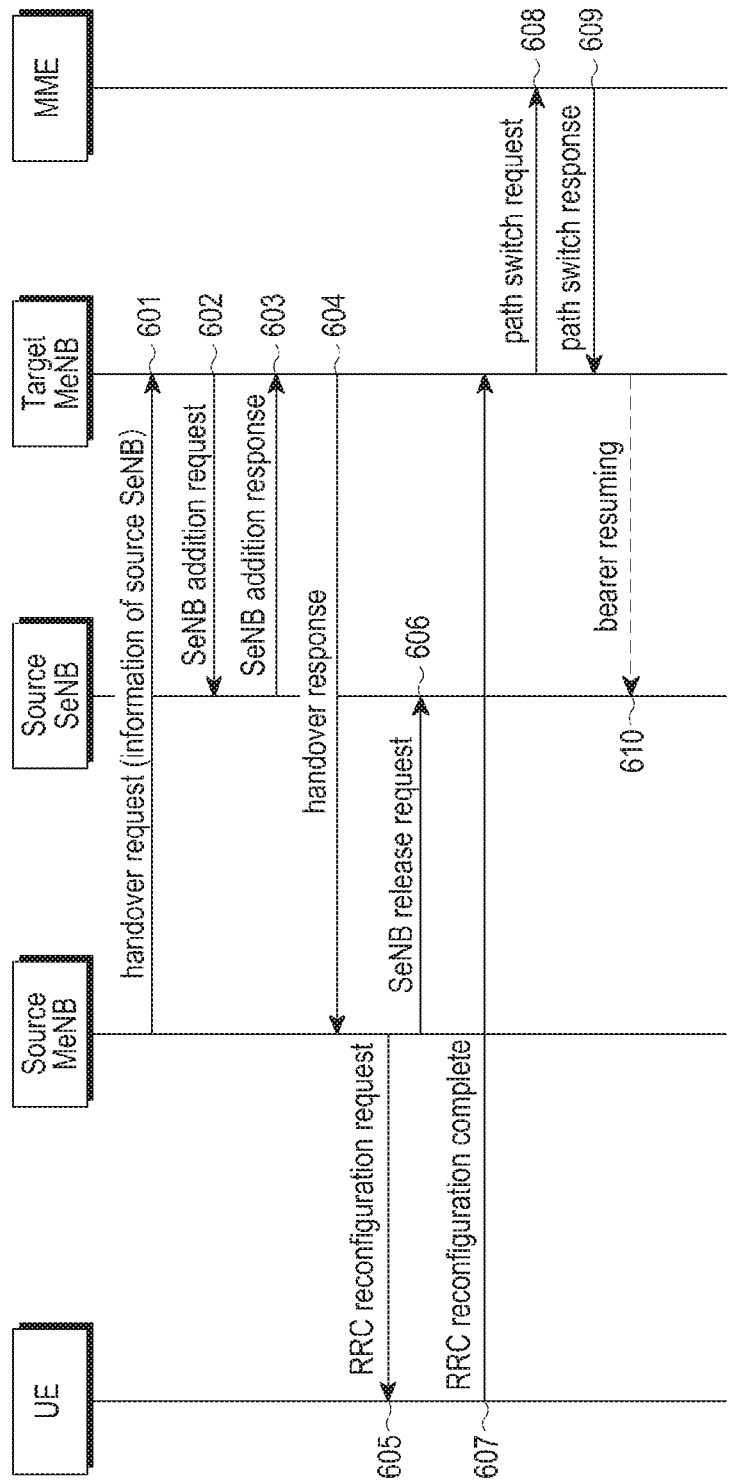
FIG. 6 is a schematic diagram illustrating a method according to a fourth embodiment of the present application.

FIG. 6 is a schematic diagram illustrating a method for a MeNB handover in a small cell system according to an embodiment of the present application, in which a source MeNB determines to handover UE to a target MeNB and the target MeNB determines the bearer is maintained as being established at the source SeNB. It includes the following blocks.

In block 601, a source MeNB sends a handover request message to a target MeNB. The message carries information of a source SeNB, which may include an identifier of the source SeNB or a cell identifier of a source Scell. The cell identifier may be a cell global unique identifier, or the cell identifier may include a Physical Cell Identifier (PCI) and frequency information.

The handover request message also includes an identifier of the bearer, QoS information of the bearer, UE measurement report and UE capability information, etc. The source MeNB provides all UE information stored at the source MeNB, and those information is sent to the target MeNB through a handover request message. Then, based on those information, the target MeNB determines whether to select the source SeNB as the target SeNB. When the channel quality of the cell of the source SeNB is good enough and there is an X2 interface available between the target MeNB and the source SeNB, the target MeNB may determine to select the source SeNB as the target SeNB, that is, the source SeNB and the target SeNB are the same, and the bearer established originally at the source SeNB is still established at the target SeNB. In the following example, the source SeNB is same as the target SeNB.

In block 602, according to the handover request message, the target MeNB determines to continue using the source SeNB as the target SeNB. The bearer established originally at the source SeNB is not handovered to the target MeNB, but is maintained at the source SeNB. It can avoid frequent bearer establishment and release. The target MeNB determines to configure the source SeNB as the target SeNB, and the source Scell as the target Scell. The bearer established at the source SeNB before handover is still established at the target SeNB. Or, the target MeNB determines to configure the source SeNB as the target SeNB, and the target Scell may be same as the source Scell or different from the source Scell. The bearer established at the source SeNB before handover is still established at the target SeNB. The target MeNB sends a new key, i.e., a SeNB KeNB (S-KeNB), to the target SeNB.

The new key is carried in a SeNB addition request message. The SeNB addition request message also carries information required for RRC configuration, such as UE capability, UE configuration information at the current target Pcell. An address for receiving uplink data may be configured as an IP address of the source SGW and a tunnel number. During path switch, MME may send a new address for receiving uplink data to the target MeNB, then after receiving the new address for receiving uplink data, the target MeNB forwards the address to the target SeNB.

In block 603, the target SeNB sends a SeNB addition response message to the target MeNB. The handover response message carries RRC configuration information for UE, and also carries an identifier of the bearer which is established successfully. If data forwarding is needed for the bearer, the handover response message also carries an IP address and a tunnel number for data forwarding. If the bearer is originally established at the source MeNB, the source MeNB sends the data packet on the bearer to the target SeNB according to the address for data forwarding. If the bearer is originally established at the source SeNB, the source SeNB sends the data packet on the bearer to the target SeNB according to the address for data forwarding. Here, the source SeNB is same as the target SeNB, and the data forwarding is performed within the eNB. The RRC configuration information for UE carried in the message also includes configuration information for random access, which is used for synchronization between UE and the SeNB. After synchronized, the target SeNB starts sending data to the UE.

In block 604, the target MeNB sends a handover response message to the source MeNB, the message carrying configuration information of the bearer for the UE, which includes configuration information of the bearer at the target SeNB. The message is carried via a RRC container. The handover response message in block 604 also includes the following information:

1. an identifier of the bearer that is established successfully.

2. an IP address and a tunnel number for data forwarding. For the bearer still established at the source SeNB, the address for data forwarding is configured to include the IP address of the source SeNB and the tunnel number allocated by the source SeNB, which are obtained at block 603. After the message at block 604 is received, the source MeNB sends a bearer release request message at block 606. The message carriers an address for data forwarding, in which the IP address is set to be the IP address of the source SeNB and the tunnel number is the tunnel number allocated by the source SeNB. In this way, the source SeNB may be aware that the data forwarding is an internal data forwarding.

3. The message also carries an indicator of bearer suspending. The bearer suspending refers to that the bearer is not handovered to the new eNB. According to the indicator of bearer suspending, the source MeNB is aware that a same SeNB is configured by the target MeNB, and the SeNB is not changed during the handover procedure. The source MeNB sends a bearer release request message to the source SeNB, the message carrying an identifier of the bearer and information of bearer suspending.

In block 605, the source MeNB sends a RRC reconfiguration request message to UE.

In block 606, the source MeNB sends a SeNB release request message to the source SeNB. The message may include an identifier of the bearer to be released, and may also include an IP address and a tunnel number for data forwarding. If in the address for data forwarding, the IP address is set to be the IP address of the source SeNB and the tunnel number is the tunnel number allocated by the source SeNB, the source SeNB may be aware that the data forwarding is an internal data forwarding.

Or, the source MeNB sends a SeNB modification request message to the source SeNB, where the target SeNB and the source MeNB are the same, and the message carries an identifier of the bearer to be released and indication information to indicate whether the bearer is suspended. According to the information, the source SeNB is aware that the bearer is established at a same eNB, and the data forwarding is an internal data forwarding. The address for data forwarding is specified by the IP address and the tunnel number for data forwarding. The source SeNB suspends data transmission at the bearer which needs to be suspended.

In block 607, the UE sends a RRC reconfiguration complete message to the target MeNB. The UE also originates the synchronization procedure towards the source SeNB. This synchronization procedure is not limited when to happen in accordance with the operation in block 607, i.e., the synchronization procedure can be originated before or after block 607.

In block 608, the target MeNB sends a path switch request message to the MME, the message including the bearer and the corresponding IP address and TEID for downlink reception, the bearer including the bearers established at the target MeNB and the target SeNB. With respect to the bearer established at the target SeNB, the IP address and TEID for downlink reception for the bearer are allocated by the target SeNB. The message is sent from the MME to the SGW, which is same as the existing method, and thus omitted herein.

In block 609, the MME sends a path switch response message to the target MeNB. If the SGW switch is performed, the message includes the uplink IP address and TEID allocated by the SGW. The message also includes encrypted information and other necessary information.

In block 610, the target MeNB sends a bearer resuming message to the source SeNB. After the path switch response message is received, if needed, for example, when the address for receiving uplink data is changed, the target MeNB sends the bearer resuming message to the source SeNB. The message may include an identifier of the bearer, and may also include the uplink IP address and TEID allocated by the SGW. After receiving the message, the source SeNB is aware of the new address for receiving uplink data, i.e., the uplink IP address and TEID allocated by the SGW. Then the SGW sends the downlink data to the source SeNB. After the synchronization procedure is completed, the source SeNB sends the data to UE and receives uplink data from UE.

Using the method as described in FIG. 6, it enables the source SeNB to continually work during the MeNB handover process, and to avoid the frequent bearer release and addition, reduce the data forwarding, and improve the system throughput and the data rate of transmission.

Figure 7:
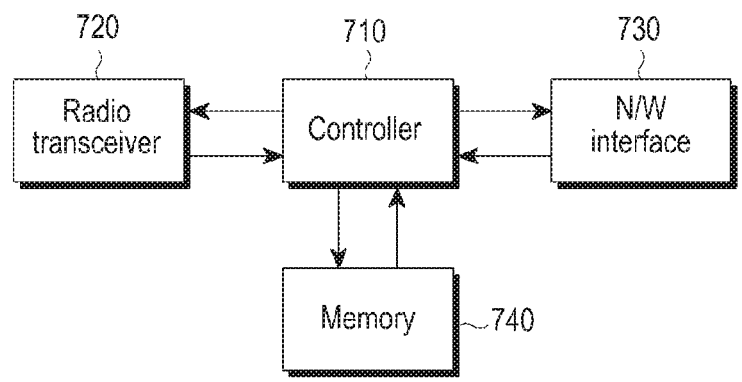
FIG. 7 is a block diagram illustrating an eNB according to an embodiment of the present application.

FIG. 7 is a block diagram illustrating an eNB according to an embodiment of the present application.

Referring to FIG. 7, an eNB may be configured to include a controller 710, a radio transceiver 720, a network interface 730, and a memory 740. The radio transceiver 720 may communicate uplink and/or downlink signals with a UE, and the network interface 730 may exchange information for inter eNB communication with other eNB(s). The controller 710 may generate signals and information to be transmitted from the radio transceiver 720 and the network interface 730, interpret received signals and information, or control operation of the radio transceiver 720 and network interface 740, according to at least one of the aforementioned embodiments. The memory 740 may store program codes, instructions, parameters, and the like, necessary for operation of the controller 710.

The foregoing only describes preferred examples of the present invention and is not used to limit the present invention. Any modification, equivalent substitution and improvement without departing from the spirit and principle of the present invention are within the protection scope of the present invention.

Various embodiments of the present disclosure may be implemented as a computer-readable codes embodied on a computer-readable recording medium from a particular perspective. The computer-readable recording medium is any data storage device that may store data readable to computer systems. Examples of the computer-readable recording medium may include read only memories (ROMs), random access memories (RAM), compact disk-read only memories (CD-ROMs), magnetic tapes, floppy disks, optical data storage devices, carrier waves (e.g., data transmission via the Internet), and the like. The computer-readable recording medium may be distributed by computer systems connected over a network, and thus the computer-readable codes may be stored and executed in distributed ways. Furthermore, functional programs, codes, and code segments for achieving various embodiments of the present disclosure may be readily interpreted by skilled programmers in the art to which embodiments of the present disclosure are applied.

It will be appreciated that the embodiments of the present disclosure may be implemented in a form of hardware, software, or a combination of hardware and software. The software may be stored as program instructions or computer readable codes executable on the processor on a non-transitory computer-readable medium. Examples of the non-transitory computer readable recording medium include magnetic storage media (e.g., a ROM, floppy disks, hard disks, and the like), and optical recording media (e.g., CD-ROMs, Digital Video Disks (DVDs), and the like). The non-transitory computer readable recording medium can also be distributed over network coupled computer systems so that the computer readable code is stored and executed in a distributed fashion. This media can be read by the computer, stored in the memory, and executed by the processor. The various embodiments may be implemented by a computer or portable terminal including a controller and a memory, and the memory may be an example of the non-transitory computer readable recording medium suitable for storing a program or programs having instructions that implement the embodiments of the present disclosure. The present disclosure may be implemented by a program having codes for embodying the apparatus and method described in claims, the program being stored in a machine (or computer) readable storage medium. The program may be electronically carried on any medium, such as communication signals transferred via wired or wireless connection, and the present disclosure suitably includes its equivalent.

The electronic device in accordance with the embodiments of the present disclosure may receive and store the program from a program provider connected thereto via cable or wirelessly. The program provider may include a memory for storing programs having instructions to perform the embodiments of the present disclosure, information necessary for the embodiments of the present disclosure, and the like, a communication unit for wired/wirelessly communicating with mobile devices, and a controller for transmitting the program to the mobile devices on request or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for managing a connection with a user equipment (UE) by a source master base station in a wireless communication system, the method comprising:
   transmitting, to a target master base station, a first control message for handover request, the first control message including information of a secondary base station involved in a dual connectivity for the UE;
   receiving, from the target master base station, a second control message in response to the first control message, the second control message including information indicating that information of the UE at the secondary base station is kept; and
   transmitting, to the secondary base station, a third control message for requesting release of resources related to the UE, the third control message including the information indicating that the information of the UE at the secondary base station is kept,
   wherein the second control message includes the information indicating that the information of the UE at the secondary base station is kept, if the target master base station determines to keep the UE information in the secondary base station.

2. The method according to claim 1, further comprising: transmitting, to the UE, a fourth control message for radio resource control (RRC) reconfiguration request to apply a new configuration related to the target master base station.

3. The method according to claim 2, wherein the second control message comprises information for the new configuration related to the target master base station, and the fourth control message comprises the information for the new configuration acquired from the second control message.

4. A method for managing a connection with a user equipment (UE) by a target master base station in a wireless communication system, the method comprising:
   receiving, from a source master base station, a first control message for handover request, the first control message including information of a secondary base station involved in a dual connectivity for the UE;
   transmitting, to the source master base station, a second control message in response to the first control message, the second control message including information indicating that information of the UE at the secondary base station is kept; and
   transmitting a third control message for addition request to the secondary base station, the third control message including the information of the secondary base station,
   wherein the second control message includes the information indicating that the information of the UE at the secondary base station is kept, if the target master base station determines to keep the UE information in the secondary base station.

5. The method according to claim 4, further comprising: receiving a fourth message for addition response from the secondary base station.

6. The method according to claim 4, wherein the second control message comprises information for a new configuration to be sent to the UE and related to the target master base station.

7. The method according to claim 4, further comprising:
   receiving, from the UE, a fifth control message for informing radio resource control (RRC) reconfiguration complete; and
   transmitting, to the secondary base station, a sixth control message for informing the RRC reconfiguration complete.

8. A source master base station for managing a connection with a user equipment (UE) mobility, the source master base station comprising:
   a radio transceiver configured to communicate the UE;
   a network interface unit configured to:
   transmit, to a target master base station, a first control message for handover request, the first control message including information of a secondary base station involved in a dual connectivity for the UE,
   receive, from the target master base station, a second control message in response to the first control message, the second control message including information indicating that information of the UE at the secondary base station is kept, and
   transmit, to the secondary base station, a third control message for requesting release of resources related to the UE, the third control message including the information that the information of the UE at the secondary base station is kept; and
   a controller configured to control operations of the radio transceiver and the network interface unit,
   wherein the second control message includes the information indicating that the information of the UE at the secondary base station is kept, if the target master base station determines to keep the UE information in the secondary base station.

9. The source master base station according to claim 8, wherein the radio transceiver is configured to transmit, to the UE, a fourth control message for radio resource control (RRC) reconfiguration request to apply a new configuration related to the target master base station.

10. The source master base station according to claim 9, wherein the second control message comprises information for the new configuration related to the target master base station, and the fourth control message comprises the information for the new configuration acquired from the second control message.

11. A target master base station for managing a connection with a user equipment (UE), the target master base station comprising:
   a radio transceiver configured to communicate the UE;
   a network interface unit configured to:
   receive, from a source master base station, a first control message for handover request, the first control message including information of a secondary base station involved in a dual connectivity for the UE,
   transmit, to the source master base station, a second control message in response to the first control message, the second control message including information indicating that information of the UE at the secondary base station is kept, and
   transmit a third control message for addition request to the secondary base station, the third control message including the information of the secondary base station; and
   a controller configured to control operations of the radio transceiver and the network interface unit,
   wherein the second control message includes the information indicating that the information of the UE at the secondary base station is kept, if the target master base station determines to keep the UE information in the secondary base station.

12. The target master base station according to claim 11, wherein the second control message comprises information for a new configuration to be sent to the UE and related to the target master base station.

13. The target master base station according to claim 11, wherein the network interface unit is further configured to:
   receive a fourth message for addition response from the secondary base station.

14. The target master base station according to claim 11, wherein the radio transceiver is configured to receive, from the UE, a fifth control message for informing radio resource control (RRC) reconfiguration complete, and wherein the network interface unit is configured to transmit, to the secondary base station, a sixth control message for informing the RRC reconfiguration complete.

* * * * *

UNITED STATES PATENT AND TRADEMARK OFFICE
CERTIFICATE OF CORRECTION

Page 1 of 1

PATENT NO. : 10,368,275 B2
APPLICATION NO. : 15/887458
DATED : July 30, 2019
INVENTOR(S) : Lixiang Xu et al.

It is certified that error appears in the above-identified patent and that said Letters Patent is hereby corrected as shown below:

In Claim 1 at Column 15 Line 2, Claim 4 at Column 15 Line 32, Claim 8 at Column 16 Line 9, and Claim 11 at Column 16 Line 45, for the text "UE information in", each occurrence, should read --information of the UE at--.

In Claim 8 at Column 15 Line 49, the text "(UE) mobility, the", should read --(UE), the--.

In Claim 8 at Column 15 Line 51, and Claim 11 at Column 16 Line 25, for the text "communicate the", each occurrence, should read --communicate with the--.

In Claim 8 at Column 16 Lines 1 and 2, the text "information that", should read --information indicating that--.

Signed and Sealed this
Fifteenth Day of October, 2019

Andrei Iancu
*Director of the United States Patent and Trademark Office*